United States Patent

Mizutani et al.

Patent Number: 5,483,216
Date of Patent: Jan. 9, 1996

[54] FIXING ASSEMBLY OF A TEMPERATURE RESPONSIVE ELEMENT AND ITS FIXING METHOD

[75] Inventors: Yasukazu Mizutani, Nagoya; Shigemi Sato, Tokai; Hideki Koseki, Aichi; Ryuhei Tanigaki; Takayuki Iio, both of Nishi-biwajima, all of Japan

[73] Assignees: Ubukata Industries Co., Ltd., Nagoya; Mitsubishi Jukogyo Kabushiki Kaisha, Tokyo, both of Japan

[21] Appl. No.: 65,115

[22] Filed: May 20, 1993

[30] Foreign Application Priority Data

May 21, 1992 [JP] Japan ................................. 4-155940

[51] Int. Cl.$^6$ .................................................. H01H 37/52
[52] U.S. Cl. ............................ 337/370; 337/342; 337/349
[58] Field of Search ................................. 337/370, 342, 337/343, 345, 346, 349, 365, 371, 372, 375

[56] References Cited

U.S. PATENT DOCUMENTS 5,043,690  8/1991  Wahls .................................. 337/370
5,121,095  6/1992  Ubukata .

FOREIGN PATENT DOCUMENTS 0190858    8/1986   European Pat. Off. .
52-38177   3/1977   Japan .............................. H01H 37/52
57-124942  8/1982   Japan .............................. H01H 37/02
61-167347 10/1986   Japan .............................. H01H 37/54
2-135640   5/1990   Japan .............................. H01H 37/54
2045529   10/1980   United Kingdom .

*Primary Examiner*—Lincoln Donovan
*Attorney, Agent, or Firm*—McGlew and Tuttle

[57] ABSTRACT

A fixing method and assembly of a temperature responsive element capable of detecting variation in temperature of discharge cooling medium of a compressor exactly and rapidly and preventing the compressor from being burned. A through hole is formed in a cover 6 which covers a path 7B for discharge cooling medium of the compressor. A plug 9 is fixed to the through hole from the side of the path by a fixing member 13. In this case, it is sealed airtightly by means of a packing. Lead terminal pins penetrating the plug 9 is insulatively fixed in the plug airtightly. Leads are connected to one ends of the lead terminal pins projecting outside and the temperature responsive element 8 is connected to the other ends of the lead terminal pins projecting on the side of the discharge path. The temperature responsive element 8 is disposed not to come into direct contact with a vessel and the cover 6 of the compressor and is exposed to discharge cooling medium as a whole. Consequently, the temperature responsive element can detect a temperature of the discharge cooling medium exactly and rapidly without influence of external disturbance such as heat from the outside and a path 7A for suction cooling medium.

8 Claims, 5 Drawing Sheets

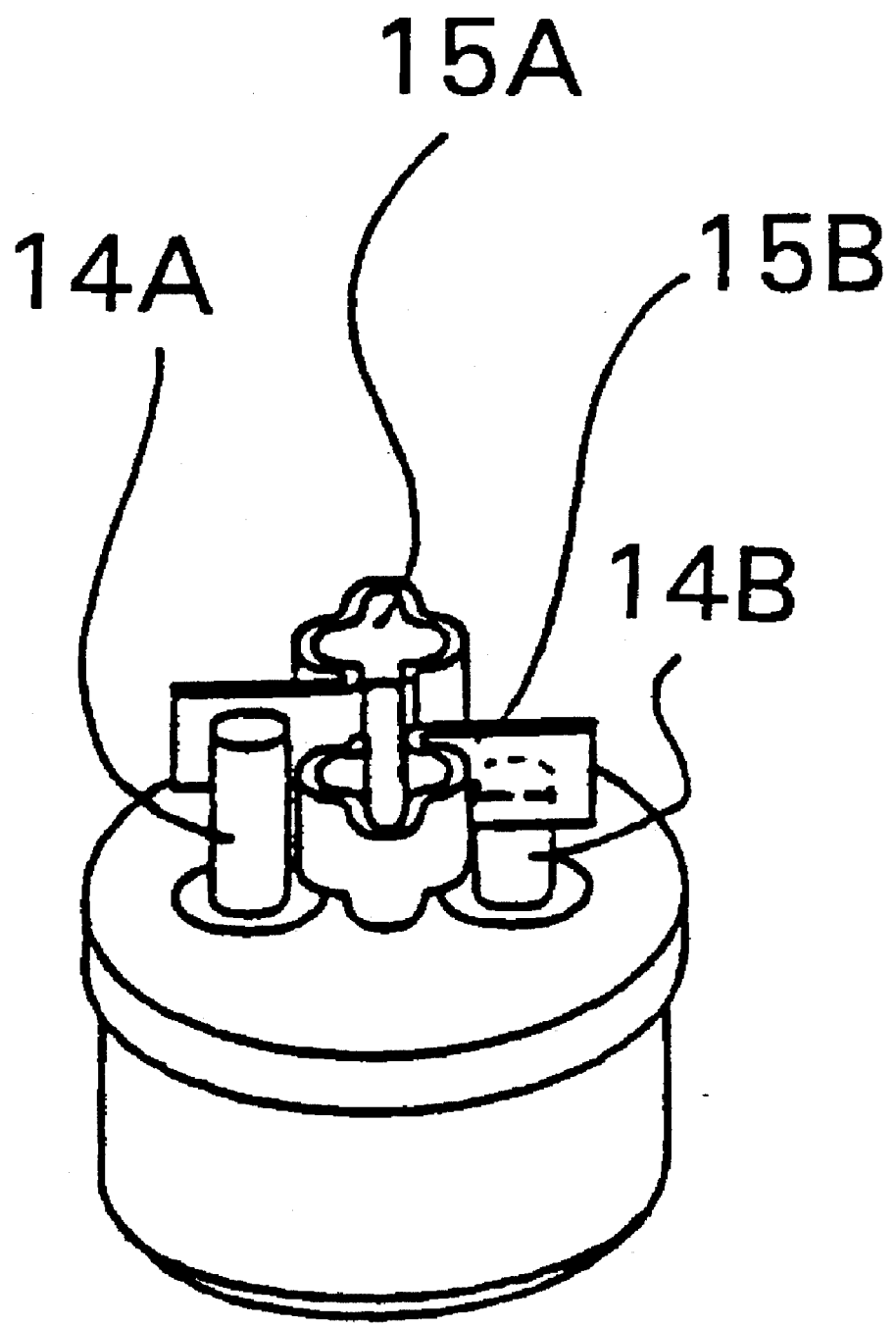

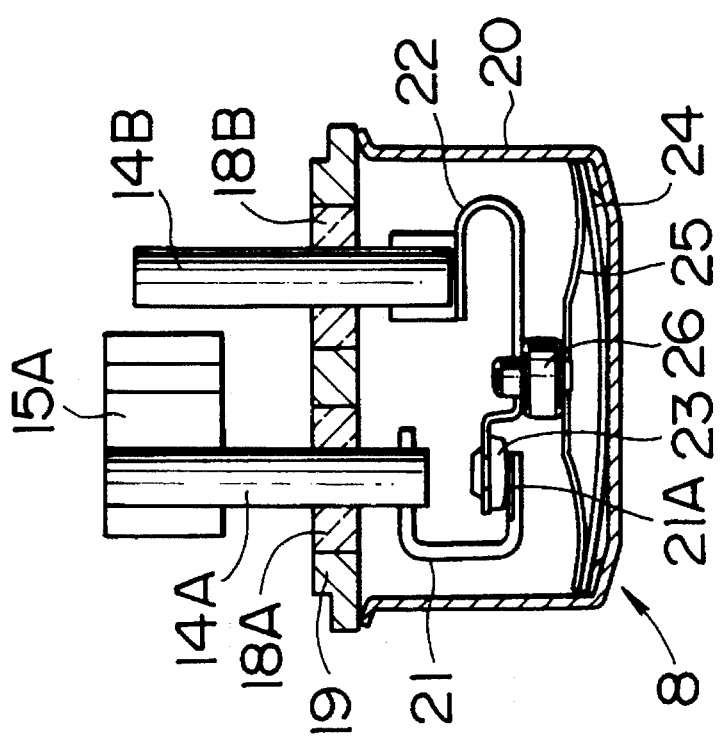

FIXING ASSEMBLY OF A TEMPERATURE RESPONSIVE ELEMENT AND ITS FIXING METHOD

FIELD OF THE INVENTION AND RELATED ARTS

The present invention relates to a fixing assembly of a temperature responsive element to a compressor, for example, and its fixing method. The temperature responsive element detects a temperature of a discharge cooling medium of a compressor mounted in an automobile, for example, and produces a signal for turning on and off a solenoid controlled clutch for transmission of motive power to the compressor.

FIG. 5 shows in section a compressor to which a temperature responsive element is mounted or fixed in a prior art arrangement.

A compressor 101 includes an aluminum die-casted cover 103, which forms a path for a discharge cooling medium in cooperation with a vessel 102 on the inside of the cover. The cover 103 is formed with a recess 103A in which the temperature responsive element 104 is fixed, for example, by engaging a threaded portion on the surface of a case of the temperature responsive element into the recess.

The temperature responsive element 104 of FIG. 5 detects a variation in temperature of the discharge cooling medium through the cover 103 and the case of the temperature responsive element. Accordingly, even if a thickness of the recess 103A is thinned, the element has a slow temperature responsive characteristic. It is necessary that the cover 103A is made of metal so that the thermal conductivity thereof is increased. Heat is lost from the cooling medium and it is difficult to detect an exact temperature of the cooling medium. Particularly, in the compressor mounted in an automobile, tile temperature of the cooling medium is greatly influenced by external disturbance such as the temperature of the outside air and wind occurring upon driving.

Referring to FIG. 6 showing another prior art arrangement, a temperature responsive element 105 having the function of a cover of a path for the cooling medium and a case of the temperature responsive element is mounted in a vessel 102 of a compressor.

In the case of FIG. 6, since the cover of the compressor constitutes the case of the temperature responsive element, the thickness of the temperature responsive portion is substantially thinned as compared with that of FIG. 5, so that the temperature responsive characteristic can be improved. However, since heat received by the temperature responsive portion is lost to the circumference, the temperature responsive characteristic is not sufficient. Further, influence by external disturbance is great in the same manner as in the prior art.

In addition, in order to facilitate the assembly of the compressor, both of a discharging path and a suction path are formed in the vessel itself or are integrally molded in the cover. With such a structure, since heat on the discharge side is lost through the vessel or the cover to the suction side, it is further difficult to detect a temperature of the cooling medium exactly in the prior art fixing method.

OBJECTS AND SUMMARY OF THE INVENTION

It is an object of the present invention to provide a fixing assembly of a temperature responsive element and its fixing method having good temperature responsive characteristic.

It is another object of the present invention to provide a fixing assembly of a temperature responsive element and its fixing method in which temperature can be detected exactly and heat-resistant, vibration-resistant and pressure-resistant characteristics are excellent, the element capable of being replaced easily.

The fixing assembly of the temperature responsive element according to the present invention comprises a plug, a lead terminal pin penetrating the plug and fixed to the plug so that the lead terminal pin is electrically insulated from the plug, and a temperature responsive element housed in an airtight metal container having pressure-resistant characteristics and connected to the lead terminal pin, whereby the fixing assembly of the temperature responsive element is fixed to a through hole formed in a cover of a vessel of a compressor as a plug for closing the through hole airtightly and at this time the temperature responsive element is disposed within the vessel so that the element is thermally insulated from the plug, the vessel and the cover, the lead terminal pin being connected to a controller of the compressor through a lead.

When a discharge path for cooling medium is formed within the cover and the through hole is disposed in the discharge path, the temperature responsive clement is responsive to a temperature of the cooling medium.

In a preferred embodiment of the present invention, the plug is mounted to a surface of the cover facing on the path for the cooling medium.

In the embodiment of the present invention, the temperature responsive element includes thermally deformable material such as a bimetal formed into a substantially circular plate and which is rapidly reversed at a first operating temperature and is rapidly returned at a second operating temperature, and a movable contact plate having a movable contact biased to come into contact with a stationary contact and being driven by the reversal of the thermally deformable material, so that contact pressure is not reduced until the operating temperature is reached to thereby attain excellent vibration-resistant characteristics.

In the embodiment of the present invention, a groove is provided in a periphery of the plug and a packing is mounted in the groove to maintain a portion between the cover and the plug airtight. An engagement portion for a fixing member described later is formed in the through hole of the cover and the fixing member for fixing the plug is engaged with the engagement portion after the plug has been mounted.

The effects of the present invention are as follows. Since the temperature responsive element of the airtight metal container having high pressure-resistant characteristic is directly disposed in the path of discharge cooling medium, a temperature of the cooling medium can be detected rapidly and exactly. Further, since the temperature responsive element is disposed so that the element is mounted through the plug and does not come into direct contact with the vessel and the cover of the compressor and the whole temperature responsive clement is disposed to be exposed to the discharge cooling medium, the temperature responsive element is for the most part not influenced by heat from the vessel and the cover of the compressor and accordingly the temperature of the cooling medium can be detected exactly. At the same time, the discharge path and the suction path can be formed integrally. Further, since the plug is mounted to the cover and the temperature responsive element is mounted to the lead terminal pin by means of the terminal, the temperature responsive element and the plug can be replaced with those of good quality relatively easily by removing the cover even if there is any failure in the element and the plug.

When the plug is mounted from the side of the discharge path, the plug can resist sufficiently against increased pressure in the discharge path.

By using the temperature responsive element having the structure in which a pressure between the contacts is not reduced until the operation temperature is reached, operation error can be reduced even if the element is mounted in an apparatus wherein vibrations occur.

Furthermore, according to the present invention, a hermetically sealed structure can be attained easily by using only an insertion and fitting operation without screw.

BRIEF DESCRIPTION OF THE DRAWINGS

FIG. 3B is an enlarged view of the temperature responsive element shown rotated 90° with respect to the showing of FIG. 3A.

FIGS. 4(A) and 4(B) are a sectional views of a temperature responsive element according to the present invention;

DETAILED DESCRIPTION OF THE PREFERRED EMBODIMENTS

Embodiments of the present invention are now described with reference to the accompanying drawings.

Figure 1:
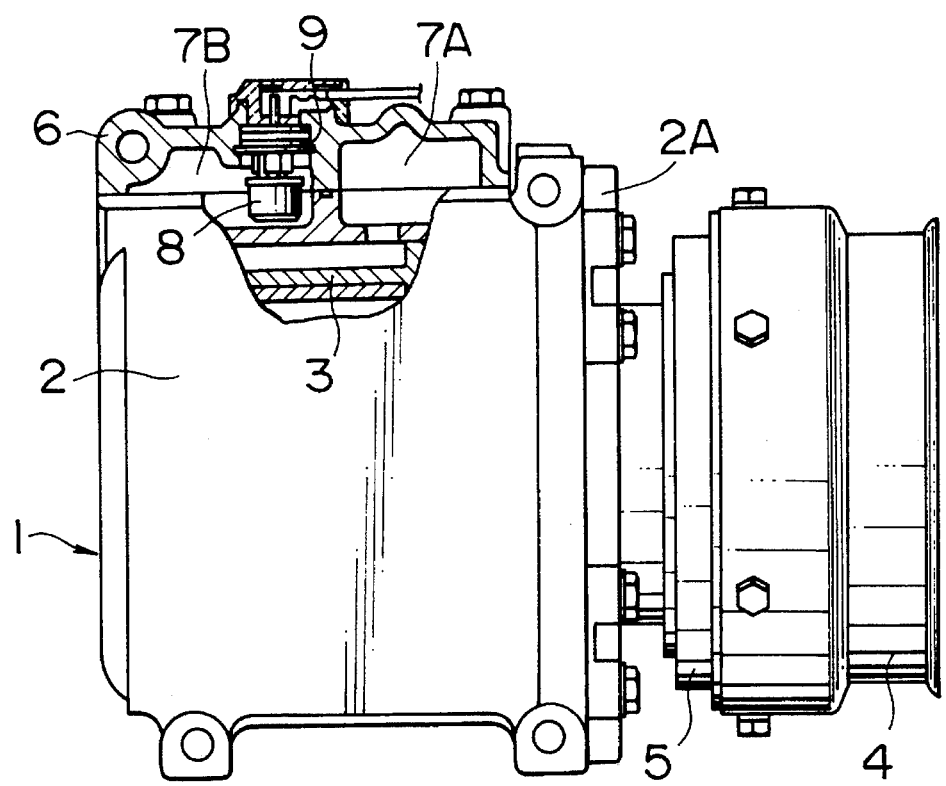
FIG. 1 is a partially sectional view of a compressor to which a temperature responsive element is mounted in accordance with the present invention.

A compressor 1 shown in FIG. 1 is one mounted in an automobile. A vessel 2 of the compressor 1 covers substantially the whole compression elements 3. A rotary shaft not shown of the compression elements 3 is substantially horizontally disposed in the figure and connected with an electromagnetic clutch described later. In this state, the vessel 2 is closed by a lid 2A. A pulley 4 is coupled with an engine by a belt not shown. The compression elements 3 receives rotatory power from the pulley 4 through an electromagnetic clutch 5 and is driven to compress a cooling medium.

The vessel 2 is further covered by a cover 6. A suction chamber 7A constituting part of a suction path of the cooling medium which is disposed in substantially parallel with the rotary shaft of the compression elements 3 and a discharge chamber 7B constituting part of a discharging path are formed between the vessel 2 and the cover 5. In the discharge chamber 7B, a temperature responsive element 8 is attached to the cover 6 through a stopper or plug 9 so that the whole temperature responsive element 8 is exposed to the cooling medium passing through the discharge chamber.

Figure 3A:
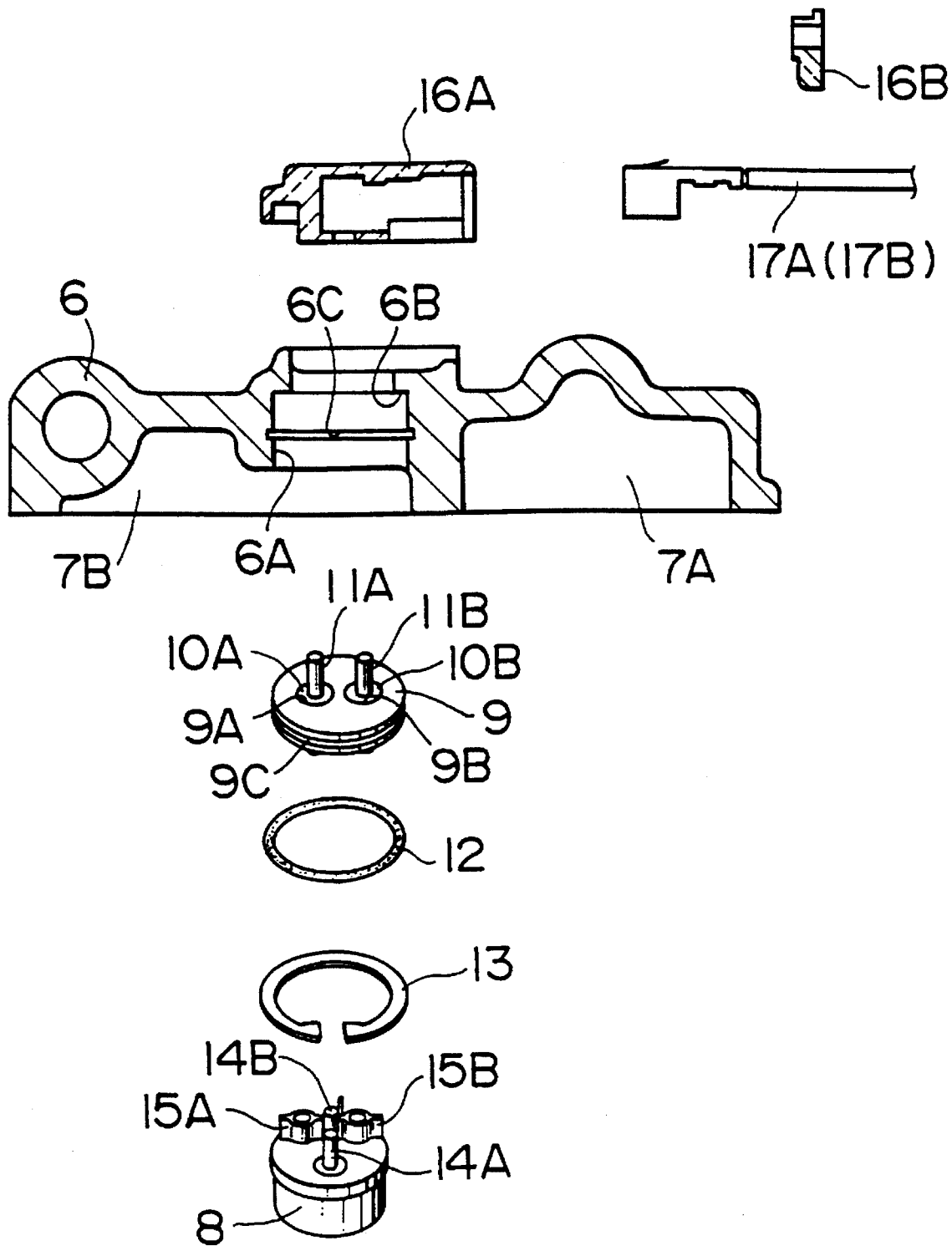
FIG. 3A is an exploded view of a fixing assembly of a temperature responsive element according to the present invention.
Figure 5:
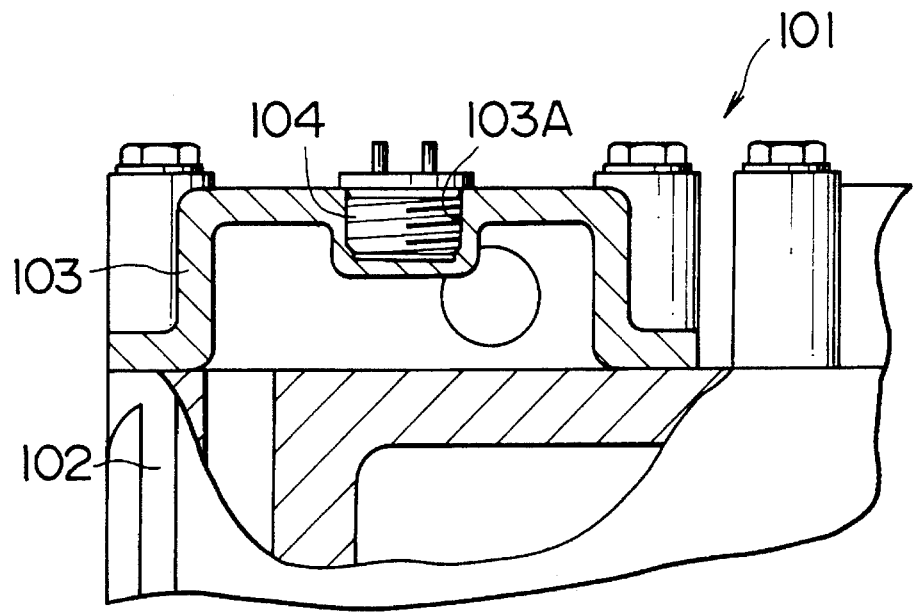
FIG. 5 is a partially enlarged sectional view of a compressor to which a temperature responsive element is mounted in a prior art.
Figure 6:
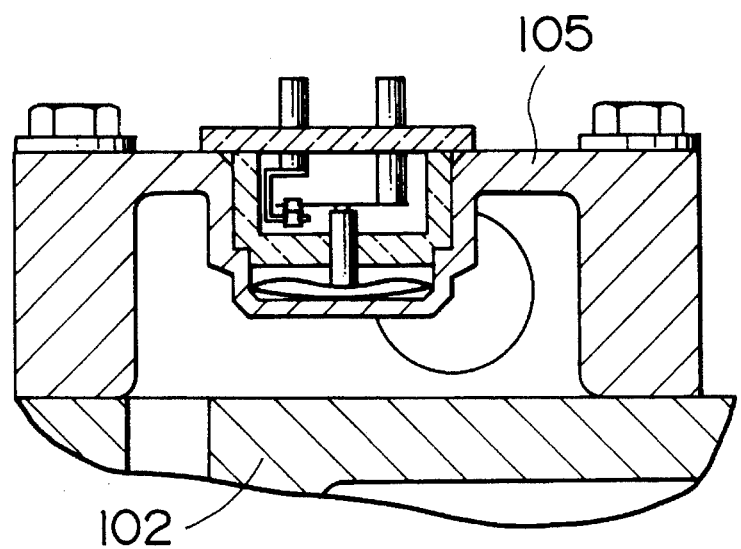
FIG. 6 is a partially enlarged sectional view of another compressor to which a temperature responsive clement is mounted in a prior art.

As shown in FIG. 3, the temperature responsive element 8 includes a hermetically sealed container made of metal having high pressure-resistant and good thermally conductive characteristics. Electrically conductive terminal pins 14A and 14B are fixed airtightly to the metal container and insulated from the container by filling material such as glass having electrically insulative characteristic. Connection terminals 15A and 15B are electrically fixed to the conductive terminal pins 14A and 14B by means of welding or the like, respectively.

Figure 2:
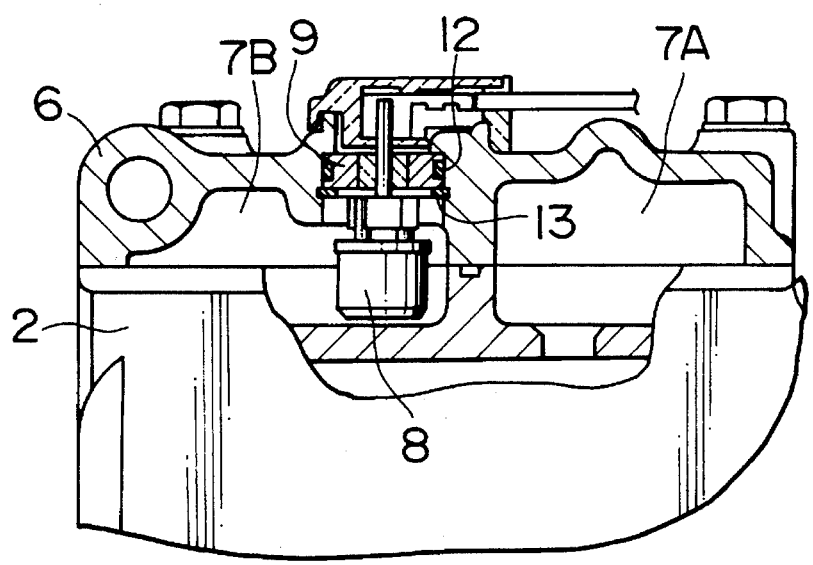
FIG. 2 is a partially enlarged sectional view of the compressor of FIG. 1.

Referring now to FIGS. 2 and 3, a supporting structure of the temperature responsive element is described in more detail.

Through holes 9A and 9B are formed in the plug 9. Lead terminal pins 11A and 11B are airtightly fixed in the through holes 9A and 9B, respectively, by means of filling material 10A and 10B such as glass having electrically insulative characteristic and low thermal conductivity. A groove 9C is formed on the periphery of the plug 9 and a packing 12 which can resist heat and the cooling medium sufficiently is held in the groove 9C. The plug 9 to which the packing 12 is attached is mounted to a through hole 6A penetrating from the discharge chamber 7B of the cover 6 to the outside of the compressor from the side of the discharge chamber. An engagement groove 6C for a fixing member is formed in a wall of the through hole 6A. A fixing member 13 is engaged in the engagement groove 6C while the plug 9 abuts against a shelf 6B. With this structure, the plug 9 is prevented from being shaky and falling off and its airtight characteristic is ensured. The attachment of the plug 9 to the cover 6 from the side of the discharge chamber can stand an increased pressure of the discharge chamber 7B sufficiently because pressure on the side of the discharge chamber of the cover is higher than that in the outside of the compressor. Furthermore, a hermetically sealed structure can be attained easily just by fitting or inserting the plug into the through hole.

After the plug 9 has been attached to the cover 6, the temperature responsive element 8 is attached through the connection terminals 15A and 15B to the tips of the lead terminal pins 11A and 11B of the plug 9 on the side of the discharge chamber. The connection terminals 15A and 15B are fixedly attached to the conductive terminal pins 14A and 14B by means of welding or the like, respectively. The temperature responsive element 8 is disposed so that the element does not come into direct contact with the cover 6 and the vessel 2 and is exposed to the cooling medium in the discharge chamber 7B as a whole when the cover 6 is attached to the vessel 2 by a predetermined method. After the cover 6 has been attached to the vessel 2, leads 17A and 17B held by connectors 16A and 16B are attached to the lead terminal pins 11A and 11B of the plug, respectively. The leads 17A and 17B are connected to a controller of the compressor not shown and the electromagnetic clutch 5 and the like are controlled by a signal from the temperature responsive element.

As described above, since the temperature responsive element 8 is not in direct contact with the cover 6 and the vessel 2, thermal influence from the vessel and the outside is suppressed to the minimum. Since the whole temperature responsive element 8 is directly exposed to the cooling medium, successful heat exchange relation is attained and the temperature responsive element can detect a temperature exactly with high response. Further, since the lead terminal pins 11A and 11B of the plug 9 are fixed by filling material 10A and 10B such as glass having low thermal conductivity, heat exchange from the vessel and the outside through the conductive portions is also suppressed.

Even if the discharge chamber and the suction chamber are integrally aluminum die-casted, thermal influence from suction cooling medium to the temperature responsive element is almost not effected and a temperature of the discharge cooling medium can be detected exactly.

Referring now to FIGS. 4A and 4B, the structure of the temperature responsive element 8 is described. The conductive terminal pins 14A and 14B are fixed to a lid plate 19 airtightly by means of electrically insulative filling material 18A and 18B such as glass. A bottomed cylindrical container 20 of metal is fixedly mounted at its open end to the vicinity of an outer periphery of the lid plate 19 by means of the ring projection welding to constitute a pressure-resistant container. A stationary contact plate 21 is fixedly mounted to an end of the conductive terminal pin 14A in the container and a movable contact support plate 22 is fixedly mounted to an end of the conductive terminal pin 14B in the container. A movable contact 23 is fixed mounted on an end of the movable contact support plate 22 and the movable contact 23 is biased to come into contact with a contact 21A of the stationary contact plate 21. A thermally deformable material 24 such as a bimetal molded into a substantially circular plate or saucer and which is rapidly reversed at a first operating temperature, for example 150° C., and rapidly returned at a second operating temperature, for example 120° C., is disposed in the bottom of the container 20 so that the thermally deformable material 24 comes into contact with the bottom of the container 20 by means of a holding plate 25. A transfer member 26 made of electrically insulative material such as ceramic is fixed tightly by means of a hole formed in the holding plate 25. At this time, by setting the spring force of the holding plate 25 to be weaker than that of the movable contact supporting plate 22, contact pressure between the contacts is regarded to be proper and the transfer member 26 is set so as not to come into contact with the thermally deformable material 24 in low temperature.

Operation of the temperature responsive element 8 is now described. The state of FIG. 4(A) is maintained until the first operating temperature 150° C. is reached. The thermally deformable material 24 is gradually deformed in its curvature in response to the temperature, but the thermally deformable material 24 does not come into contact with the transmission member 26 while the deformable material is curved to be concave as shown in FIG. 4(A). Accordingly, the movable contact supporting plate 22 is not given the force by means of the transfer member 26 and a contact pressure between the contacts is maintained constant until the reversal of the thermally deformable material 24 regardless of variation of the curvature of the deformable material 24.

When a temperature rises and reaches the first operating temperature 150° C., the thermally deformable material 24 is rapidly reversed in the snap action manner to be curved into the convex shape as shown in FIG. 4(B). The thermally deformable material 24 comes into contact with the transmission member 26 by the reversal and pushes up the transfer member 26. Thus, the movable contact supporting plate 22 is pushed up through the transmission member 26 and the contact between the stationary contact 21A and the movable contact 23 is opened. This state is maintained until the temperature is lowered and reaches the second operating temperature 120° C. Though the curvature of the thermally deformable material 24 is varied in response to variation of the temperature, the thermally deformable material is maintained in the position in which the movable contact 23 does not come into contact with the stationary contact 21A until the curved direction is returned. When the temperature is lower and reaches the second operating temperature 120° C., the thermally deformable material 24 is rapidly returned in the snap action manner and is curved into the concave shape as shown in FIG. 4(A).

Accordingly, even when the temperature responsive element is mounted in an apparatus such as, for example, an automobile wherein strong vibrations occur, the pressure between the contacts is not reduced just before the opening thereof and hence error such as so-called chattering can be reduced.

In the embodiment, 150° C. and 120° C. are used as the operating temperatures of the temperature responsive element, while it is a matter of course that the operating temperature is not limited thereto. Further, the two conductive pins are used in the embodiment, while only one pin may be used in which one of the contacts is connected to the container or the lid plate and the terminal is connected thereto, and its method is not limited to the embodiment.

We claim:

1. A fixing assembly of a temperature responsive element, comprising:

a plug;

a lead terminal pin penetrating said plug and fixed to said plug in an airtight manner;

means for thermally and electrically insulating said lead terminal pin hole said plug;

a compressor vessel including a lid closing said vessel and a cover disposed outside of said lid, said vessel defining a path for a cooling medium, said path being disposed between said cover and said lid, said cover having a through hole providing communication from outside said vessel to said path for cooling medium;

a temperature responsive element;

a temperature responsive element housing including an airtight metal container with pressure resistance characteristics, said temperature responsive element being disposed in said temperature responsive element housing, said temperature responsive element having a conductive terminal pin extending from said temperature responsive element within said temperature responsive element housing, through said temperature responsive element housing, to outside of said temperature responsive element housing, a connection, connecting said conductive terminal pin being to said lead connector pin, said plug being fixed to said cover to close said through hole, connection between said connector pin and said conductive terminal pin positioning said temperature responsive element housing, with said temperature responsive element therein, at a location in said path for cooling medium, disposed spaced from said cover and spaced from said lid.

2. A fixing assembly of a temperature responsive element according to claim 1, wherein said peg is inserted into said through hole from a high pressure side of said cover and is fixed in the state where the peg is blocked by a step formed in said cover at said through hole.

3. A fixing assembly of a temperature responsive element according to claim 1, wherein said temperature responsive element housing includes a metal container, a lid for closing said metal container airtightly, with said conductive terminal and an additional conductive terminal pin fixed to said lid by means of electrically insulative filling material, a stationary contact plate having an end on which a stationary contact portion is mounted, a movable contact supporting plate having an end on which a movable contact is mounted and for urging said movable contact to come into contact with said stationary contact portion, and a snap action type bimetal being in thermal contact with said metal container and having a sign of a curvature which is reversed when a predetermined temperature is exceeded, said bimetal pushing said movable contact supporting plate in response to the reversal of the curvature to open and close between said stationary contact portion and said movable contact, said stationary, contact plate and said movable contact supporting plate being electrically connected to said conductive terminal pin or said metal container to thereby be connected to an external circuit.

4. A fixing assembly of a temperature responsive element according to claim 1, wherein said peg is inserted into said through hole from a high pressure side of said cover and is fixed in the state where the peg is blocked by a step formed in said through hole.

5. A fixing assembly of a temperature responsive element according to claim 1, wherein said temperature responsive element housing includes a metal container, a lid for closing said metal container airtightly, with said conductive terminal fixed to said lid by means of electrically insulative filling material, a stationary contact plate having an end on which a stationary, contact portion is mounted, a movable contact supporting plate having an end on which a movable contact is mounted and for urging said movable contact to come into contact with said stationary, contact portion, and a snap action type bimetal being in thermal contact with said metal container and having a sign of a curvature which is reversed when a predetermined temperature is exceeded, said bimetal pushing said movable contact supporting plate in response to the reversal of the curvature to open and close between said stationary contact portion and said movable contact, said stationary contact plate and said movable contact supporting plate being electrically connected to said conductive terminal pin or said metal container to thereby be connected to an external circuit.

6. A fixing assembly according to claim 1, wherein said temperature responsive element housing is formed of thermally conductive metal material, said temperature responsive element including a thermally deformable material contacting thermally with said thermally conductive metal material of said temperature responsive element housing, said temperature responsive element including a switch responsive to deformation of said thermally deformable material.

7. A fixing assembly of a temperature responsive element, comprising:

a plug;

a lead terminal pin penetrating said plug and fixed to said plug in an airtight manner;

means for thermally and electrically insulating said lead terminal pin from said plug;

a compressor vessel including a lid closing said vessel and a cover disposed outside of said lid, said vessel defining a path for a cooling medium, said path being disposed between said cover and said lid, said cover having a through hole providing communication from outside said vessel to said path for cooling medium;

a temperature responsive element;

a temperature responsive element housing including an airtight metal container with pressure resistance characteristics, said temperature responsive element being disposed in said temperature responsive element housing, said temperature responsive element having a conductive terminal pin extending from said temperature responsive element within said temperature responsive element housing to outside of said temperature or responsive element housing, said conductive terminal pin being connected to said lead connector pin, said plug being fixed to said cover to close said through hole, the connection between said connector pin and said conductive terminal pin positioning said temperature responsive element housing, with said temperature responsive element therein, in said path for cooling medium.

8. A fixing assembly according to claim 7, wherein said temperature responsive element housing is formed of thermally conductive metal material, said temperature responsive element including a thermally deformable material contacting thermally with said thermally conductive metal material of said temperature responsive element housing, said temperature responsive element including a switch responsive to deformation of said thermally deformable material.

* * * * *